(12) United States Patent
Razdan et al.

(10) Patent No.: US 8,103,299 B2
(45) Date of Patent: Jan. 24, 2012

(54) UNI-DIRECTIONAL TRAFFIC CHANNEL ASSIGNMENT FOR A RECEIVE-ONLY GROUP CALL IN A MOBILE COMMUNICATION SYSTEM

(75) Inventors: Ashu Razdan, San Diego, CA (US); Harleen Gill, San Diego, CA (US); Arul Ananthanarayanan, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 12/233,085

(22) Filed: Sep. 18, 2008

(65) Prior Publication Data
US 2009/0082050 A1   Mar. 26, 2009

Related U.S. Application Data

(60) Provisional application No. 60/974,846, filed on Sep. 25, 2007.

(51) Int. Cl.
*H04Q 7/20* (2006.01)
(52) U.S. Cl. ........ 455/518; 455/519; 455/414.1; 455/517; 455/445; 455/426.1; 370/259; 370/260; 370/261; 370/262; 370/328
(58) Field of Classification Search .......... 455/518, 455/519, 500, 517, 445, 550.1, 426.2, 414.1–414.4, 455/422.1, 403, 67.11, 509, 450–453, 417, 455/426.1; 370/259, 260, 261, 262, 310, 370/328, 434, 329
See application file for complete search history.

(56) References Cited

U.S. PATENT DOCUMENTS

| 6,108,519 | A | 8/2000 | Nitta | |
|---|---|---|---|---|
| 2003/0153341 | A1 | 8/2003 | Crockett et al. | |
| 2007/0105579 | A1* | 5/2007 | Shaffer et al. | 455/519 |
| 2007/0225024 | A1* | 9/2007 | Li | 455/518 |
| 2008/0096600 | A1* | 4/2008 | Siegel | 455/519 |

FOREIGN PATENT DOCUMENTS

| WO | 03/036801 | 5/2003 |
|---|---|---|
| WO | 03/036927 | 5/2003 |

OTHER PUBLICATIONS

International Preliminary Report on Patentability, PCT/US2008/077554, International Preliminary Examining Authority, European Patent Office, Nov. 10, 2009.
International Search Report, PCT/US2008/077554, International Searching Authority, Feb. 25, 2009, European Patent Office.
Written Opinion, PCT/US2008/077554, International Searching Authority, Feb. 25, 2009, European Patent Office.

* cited by examiner

*Primary Examiner* — Keith Ferguson
(74) *Attorney, Agent, or Firm* — Raphael Freiwirth (57) ABSTRACT

Aspects of mobile communication for establishing a receive-only group communication, such as a Push-to-Talk (PTT) call or multicast call with a plurality of wireless communication devices that are in a receive-only mode are disclosed. When a group call between wireless communication devices starts from an originating device, in one embodiment indicating a receive-only group with which a group call is to be established, one or more receive-only wireless communication devices are determined and invited to participate in the group call. The traffic channel to the receive-only wireless communication device is transitioned to a uni-directional, forward-only traffic channel such that media is provided from the originating wireless communication device to the receive-only wireless communication device via the uni-directional traffic channel.

34 Claims, 7 Drawing Sheets

UNI-DIRECTIONAL TRAFFIC CHANNEL ASSIGNMENT FOR A RECEIVE-ONLY GROUP CALL IN A MOBILE COMMUNICATION SYSTEM

CLAIM OF PRIORITY UNDER 35 U.S.C. §119

The present Application for Patent claims priority to Provisional Application No. 60/974,846, entitled "UNI-DIRECTIONAL TRAFFIC CHANNEL ASSIGNMENT FOR A RECEIVE-ONLY GROUP CALL IN A MOBILE COMMUNICATION SYSTEM", filed Sep. 25, 2007, assigned to the assignee hereof and hereby expressly incorporated by reference herein in its entirety.

BACKGROUND OF THE INVENTION

1. Field of the Invention

The present invention generally relates to wireless telecommunication networks and devices. More particularly, the present invention relates to a system and method of establishing a multicast call between a plurality of wireless communication devices.

2. Description of the Related Art

Mobile communication systems suffer from the problem of interference. For example, in CDMA communications systems such as a 1xEV-DO system, interference sensitivity primarily impacts the reverse link. This occurs because the forward link is transmitted at full power, whereas the reverse link is power-controlled. Interference on the reverse link may be particularly problematic in the case of receive-only dispatch groups. Generally, in a receive-only dispatch group, a single originating mobile station broadcasts to a group of receiving mobile stations within a cell. Because the group of receiving mobile stations only listen (and do not transmit), it is referred to as a receive-only dispatch group. In the case of receive-only dispatch groups where the data may be visualized as flowing in a single direction (forward/down link), transmitting on the reverse link channels (e.g., pilot, DRC, RRI, etc.) wastes resources because access terminals outside of the receive-only dispatch group that have traffic channels up are required to transmit at higher power levels. This causes interference at all the cell cites receiving these transmissions.

SUMMARY OF THE INVENTION

Various embodiments of mobile communication systems and associated methods, devices, computer programs, protocols, and the like are provided for establishing a receive-only group call or multicast call with a plurality of receive-only wireless communication devices. One embodiment is a communication system comprising an application server configured to communicate with a wireless communication network and facilitate establishment of a receive-only group call between an originating wireless communication device and a receive-only group comprising at least one receive-only wireless communication device. The system includes a media control unit configured to manage a media session between the originating wireless communication device and the receive-only wireless communication device, and a client application, resident at the receive-only wireless communication device, that has logic configured to enable the receive-only wireless communication device to participate in the receive-only group call via a uni-directional traffic channel with the wireless communication network.

DETAILED DESCRIPTION OF THE INVENTION

This disclosure describes various embodiments of mobile communication systems and associated methods, devices, computer programs, protocols, etc. for establishing a receive-only group call or communication with a plurality of mobile, wireless communication devices. In general, the receive-only group call comprises a media session (e.g., a voice call, a data session, multimedia session, etc.) between an originating mobile communication device and a receive-only group. The receive-only group comprises a plurality of receiving mobile communication devices that are configured to be in a receive-only state. In the receive-only state or mode, the receiving mobile communication device(s) do not transmit media to the originating mobile communication device—they only receive media from the originating mobile communication device. In this regard, the terms "originating" and "receiving" are generally used to distinguish the mobile communication devices in the receive-only state from the transmitting devices. Therefore, these terms describe the role or state of the mobile communication device in the context of the receive-only group call. "Receiving" mobile communication devices are in the receive-only state (i.e., they only "receive" the media transmitted from the "originating" mobile communication device and cannot "originate" or transmit media). Only "originating" mobile communication devices can "originate" or transmit media. From the perspective of the participants in the receive-only group call, an "originating" mobile communication device is the "speaker." The "receiving" mobile communication device is the "listener" and cannot take on the role of a speaker while in the receive-only state. Therefore, it should be appreciated that the term "originating" does not necessarily refer to the party originating or initiating the receive-only group call. Rather, one of ordinary skill in the art will appreciate that the receive-only group call may be initiated by either an originating mobile communication device or one of the receive-only mobile communication devices.

As described below in more detail, the receive-only group call is established with a uni-directional traffic channel between the receive-only mobile communication device(s) and the supporting mobile communication system. As known in the art, the physical layer structure of the mobile communication system may comprise a set of channels transmitted between the mobile communication devices and an access network. The access network comprises the network equipment for providing data connectivity between a packet-switched data network (e.g., the Internet) and the mobile communication devices. A channel comprises a forward channel and a reverse channel, each of which define a hierarchy of physical channels for communication between the mobile communication devices and the access network. The forward channel comprises the physical layer channels transmitted from the access network to the mobile communication devices, whereas the reverse channel comprises the physical layer channels transmitted from the mobile communication device to the access network. Both the forward channel and the reverse channel include a traffic channel on which media is transmitted. As described below in more detail, the receive-only group call is established with a uni-directional traffic channel between the receive-only mobile communication devices and the access network. In other words, for the receive-only mobile communication devices, only a forward traffic channel is established, and the reverse traffic channel is completely closed or discontinued (often referred to as being "gated off").

Figure 1:
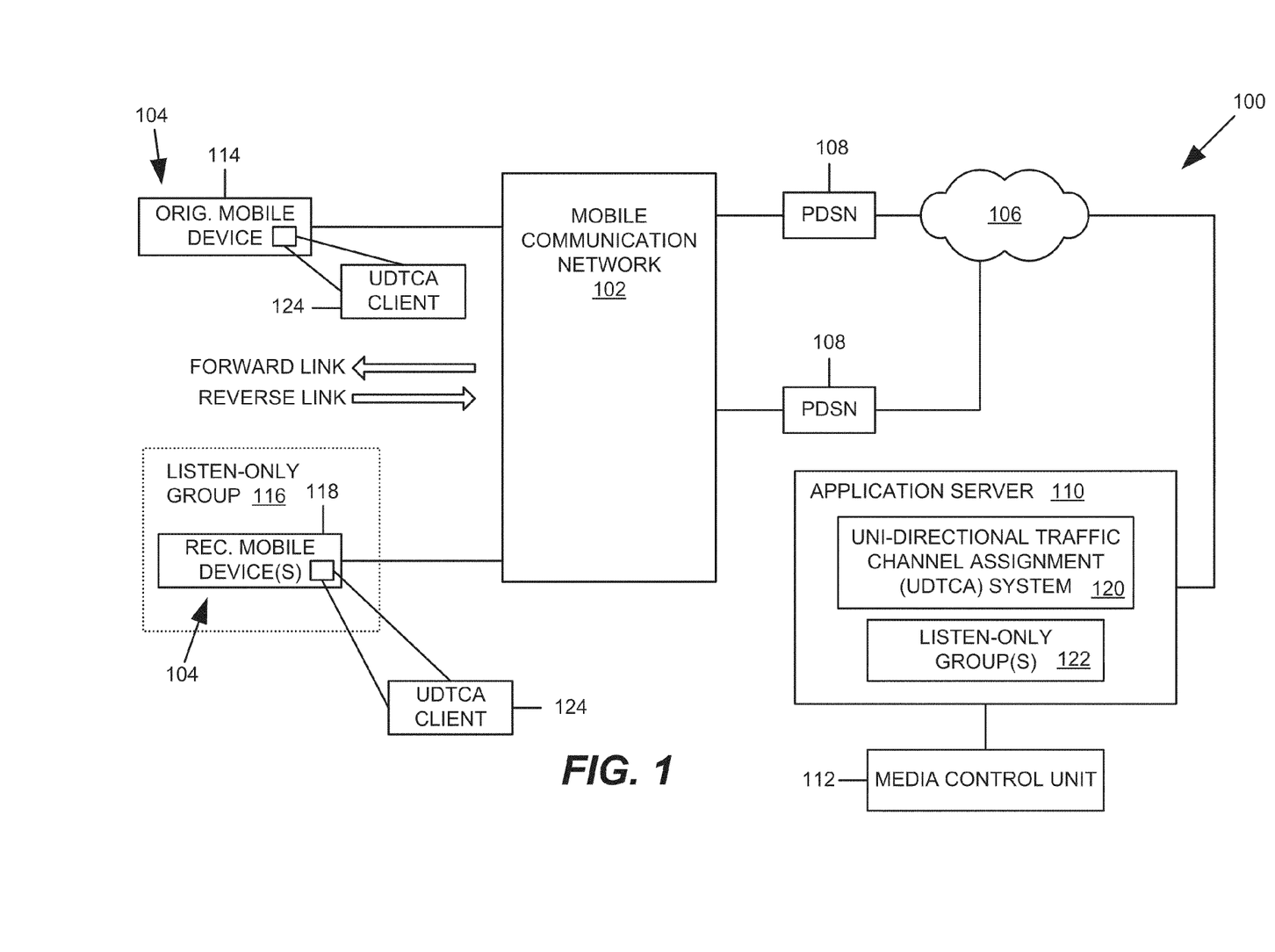
FIG. 1 is a block diagram of an embodiment of a communication system for establishing a receive-only group call via a uni-directional traffic channel assignment.

FIG. 1 illustrates one of a number of possible embodiments of a communication system 100 for implementing a receive-only group call in which a uni-directional traffic channel is established between the receive-only mobile communication devices and the supporting mobile network. As illustrated in the embodiment of FIG. 1, communication system 100 comprises a mobile communication network 102 with which mobile devices 104 communicate, a packet-switched network 106 (e.g., the Internet), packet data service node(s) (PDSN) 108, an application server 110, and a media control unit (MCU) 112. The receive-only group call is established between one or more originating mobile devices 114 and a receive-only group 116, which comprises one or more receiving mobile devices 118.

Mobile communication devices 104 may comprise, for example, mobile phones or mobile computing devices that are configured to communicate with mobile communication network 102. The mobile communication network 102 may support any desirable technologies, communication protocols, or communication standards (e.g., CDMA 2000, 1xEV-DO, etc.). Although not illustrated in FIG. 1, it should be appreciated that the mobile communication network 102 may include known components, such as, for example, a base station controller (BSC), a base transceiver station (BTS), a packet control function (PCF), etc. The mobile communication network 102 interfaces with packet-switched data network 106 via PDSN(s) 108.

In general, the application server 110 facilitates establishment of the receive-only group call, and MCU 112 manages the media-related aspects of the receive-only group call. In one embodiment, application server 110 provides services to mobile communication network 102 that facilitate establishment of the receive-only group call between originating mobile communication device(s) 114 and receiving mobile communication device(s) 118. For example, as further illustrated in FIG. 1, application server 110 may store information 122 related to receive-only group(s). The application server 110 may maintain a list of receive-only group(s), as well as data to identify each mobile communication device 104 associated with a particular receive-only group 116.

As further illustrated in FIG. 1, application server 110 comprises a uni-directional traffic channel assignment (UDTCA) system 120. UDTCA system 120 comprises the functionality, logic, etc. for facilitating the establishment of a uni-directional traffic channel between each receiving mobile communication device(s) 118. In this regard, each mobile communication device may include accompanying logic or software (e.g., UDTCA client 124) for implementing certain aspects of the call establishment process.

The UDTCA system 120 and/or UDTCA client 124 may be implemented via logic (e.g., hardware, processor-implemented software, firmware, or any combination thereof) distributed across the various devices in communication system 100. In the embodiment of FIG. 1, UDTCA system 120 is illustrated within the application server 110. It should be appreciated, however, that certain aspects of the overall logic may be distributed or otherwise located across other system components, for example, mobile devices 104 (e.g., UDTCA client 124), PDSN 108, MCU 112, and the various components of mobile communication network 102 (e.g., BSC, BTS, PCF, etc.). Furthermore, one of ordinary skill in the art will appreciate that UDTCA system 120 may be implemented via various technologies, devices, software, processes, protocols, standards, etc. and in various types of communication systems, which are known in the art (or may be developed in the future). With respect to the UDTCA client 124, it should be appreciated that the call establishment logic may be integrated with (or used in concert with) any desirable user interface functionality, such as, for example, a push-to-talk (PTT) interface, a contact list, an electronic phonebook, etc.

As mentioned above, UDTCA system 120 and UDTCA client 124 (and the associated methods, computer software, call establishment methods, software and systems, etc.) may be implemented in various types of communication systems. Various embodiments of CDMA-type systems are described below, although one of ordinary skill in the art will appreciate that these concepts may be extended to other systems, protocols, technologies, etc.

Figure 2:
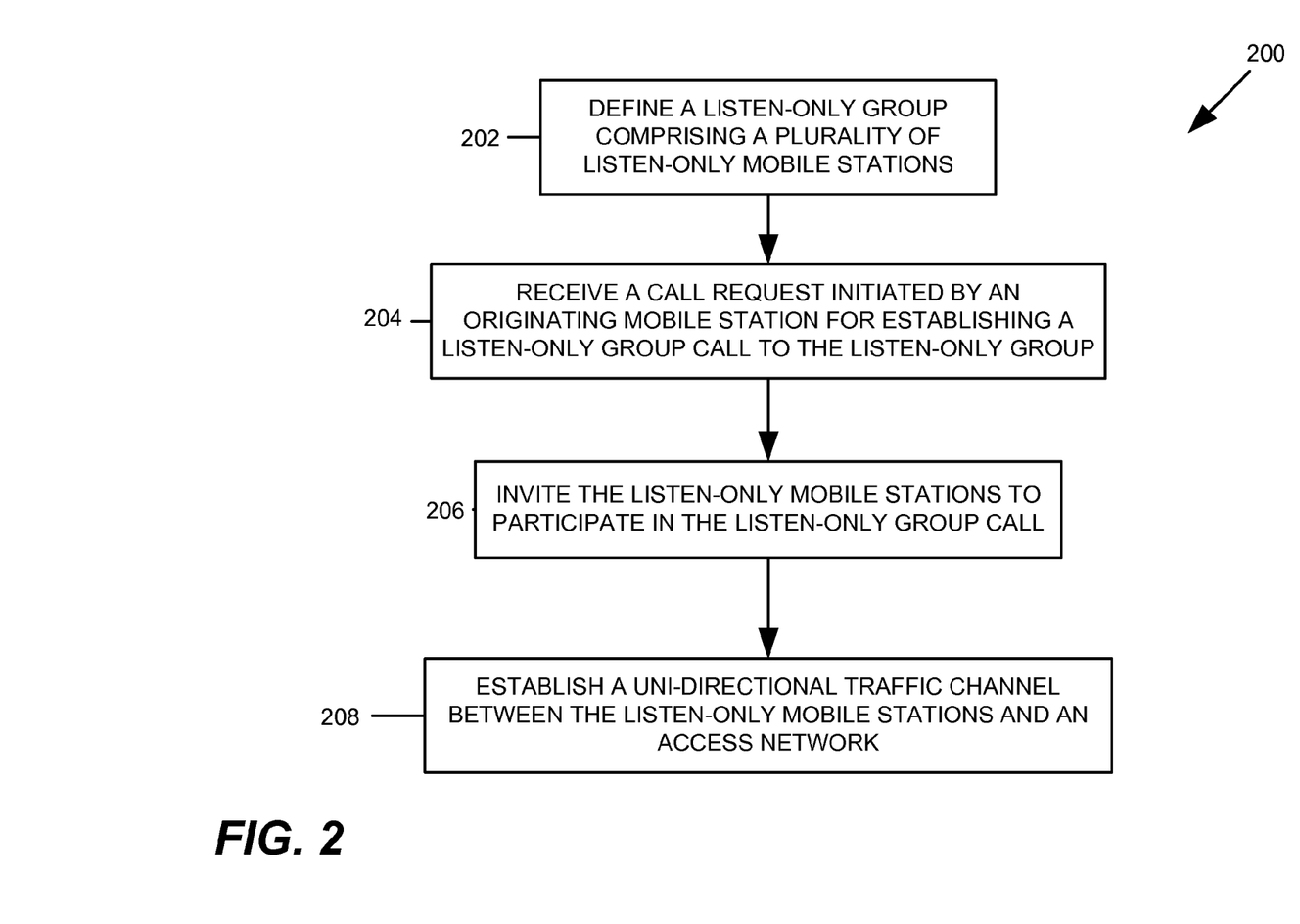
FIG. 2 is a flow chart illustrating an embodiment of a method for establishing a receive-only group call in the communication system of FIG. 1 via a uni-directional traffic channel assignment.

FIG. 2 illustrates the general process of establishing a receive-only group call between mobile devices 104. At block 202, a receive-only group 116 is defined, which comprises one or more receiving mobile stations 118. As mentioned above, application server 110 may store suitable information for defining and managing receive-only groups. In this regard, receive-only group 116 may be defined by the user of mobile device 104. In one embodiment, a user configures, specifies, or otherwise manages receive-only group(s) 116 via functionality resident on the mobile device 104. In other embodiments, however, a user may manually configure receive-only group(s) 116 via telephonic means, in person at a retail facility, or via computer devices other than mobile devices 104. At block 204, a mobile device 104 (e.g., an originating mobile device 114 or a receiving mobile device 118) initiates a request for a receive-only group call to a particular receive-only group 116. The call request is received by application server 110. In this regard, the call request may include information sufficient for application server 110 to identify the receive-only group 116. At block 206, application server 110 identifies the receive-only group 116 and the corresponding receiving mobile devices 118 in the group, and invites them to participate in the receive-only call. At block 208, a uni-directional traffic channel is established between the corresponding receiving mobile devices 118 and the mobile communication network or access network. For example, only a forward traffic channel may be established and the reverse traffic channel may be completely gated off.

Again, the UDTCA system 120 and UDTCA client 124 may be configured to support various technologies, communication protocols and standards, etc. and may be implemented in various types of communication systems. Referring to FIGS. 3-10, in certain embodiments, the UDTCA system 120 is implemented in a code division multiple access (CDMA) communication system according to CDMA standards, such as described in the CDMA specification document, entitled "cdma2000 High Rate Packet Data Air Interface Specification" of the 3$^{rd}$ Generation Partnership Project 2 ("3GPP2"), referenced as 3GPP2 C.S0024-A version 2.0, which is hereby incorporated by reference in its entirety, including all prior versions of same.

Figure 3:
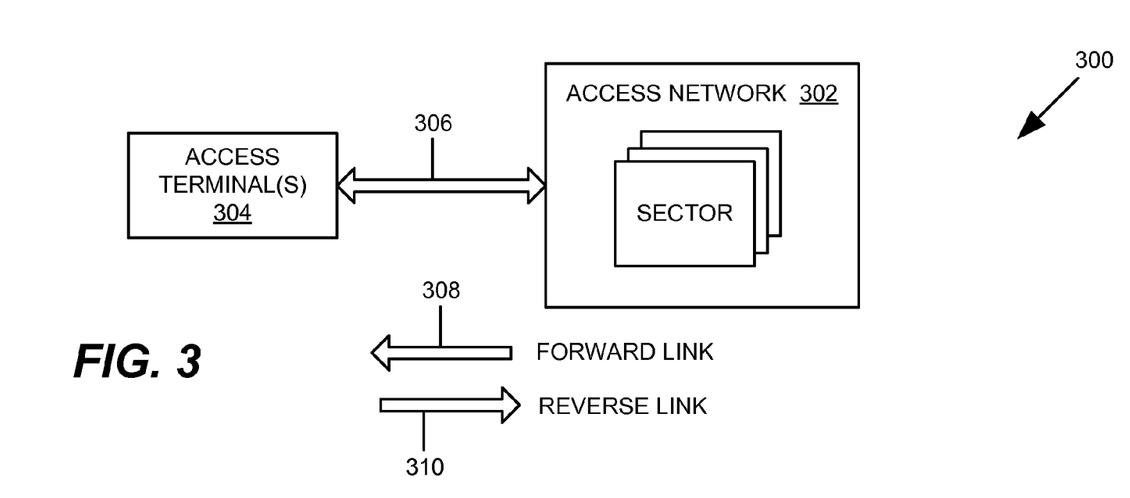
FIG. 3 is an architecture diagram of a CDMA communication system in which a receive-only group call may be established via a uni-directional traffic channel assignment.

FIG. 3 illustrates the general architecture of a CDMA communication system 300. The CDMA communication system 300 generally comprises an access network 302 and a plurality of access terminals 304. As defined in the 3GGP2 standards document identified above, access network 302 comprises the network equipment for providing data connectivity, via air interface 306, between a packet-switched data network, such as the Internet, and access terminals 304. An access terminal 304 comprises a device for providing data connectivity to an end user. For example, access terminal 304 may comprise a mobile communication device, a mobile or cellular telephone, or any mobile computing device. An access terminal 304 may be connected to a computing device, such as a laptop personal computer, or it may be a self-contained data device, such as a personal digital assistant. Air interface 306 includes a forward link 308 and a reverse link 310. The forward link 308 comprises the physical layer channels transmitted from access network 302 to access terminals 304. The reverse link 310 comprises the physical layer channels transmitted from access terminals 304 to the access network 302. The air interface 306 is described in great detail in the 3GPP2 standards document identified above.

Figure 4:
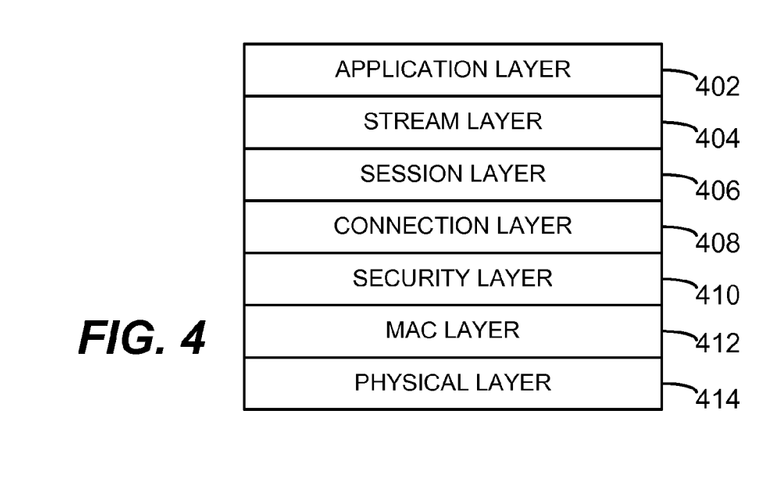
FIG. 4 is a layering architecture diagram of the CDMA communication system of FIG. 3.
Figure 5:
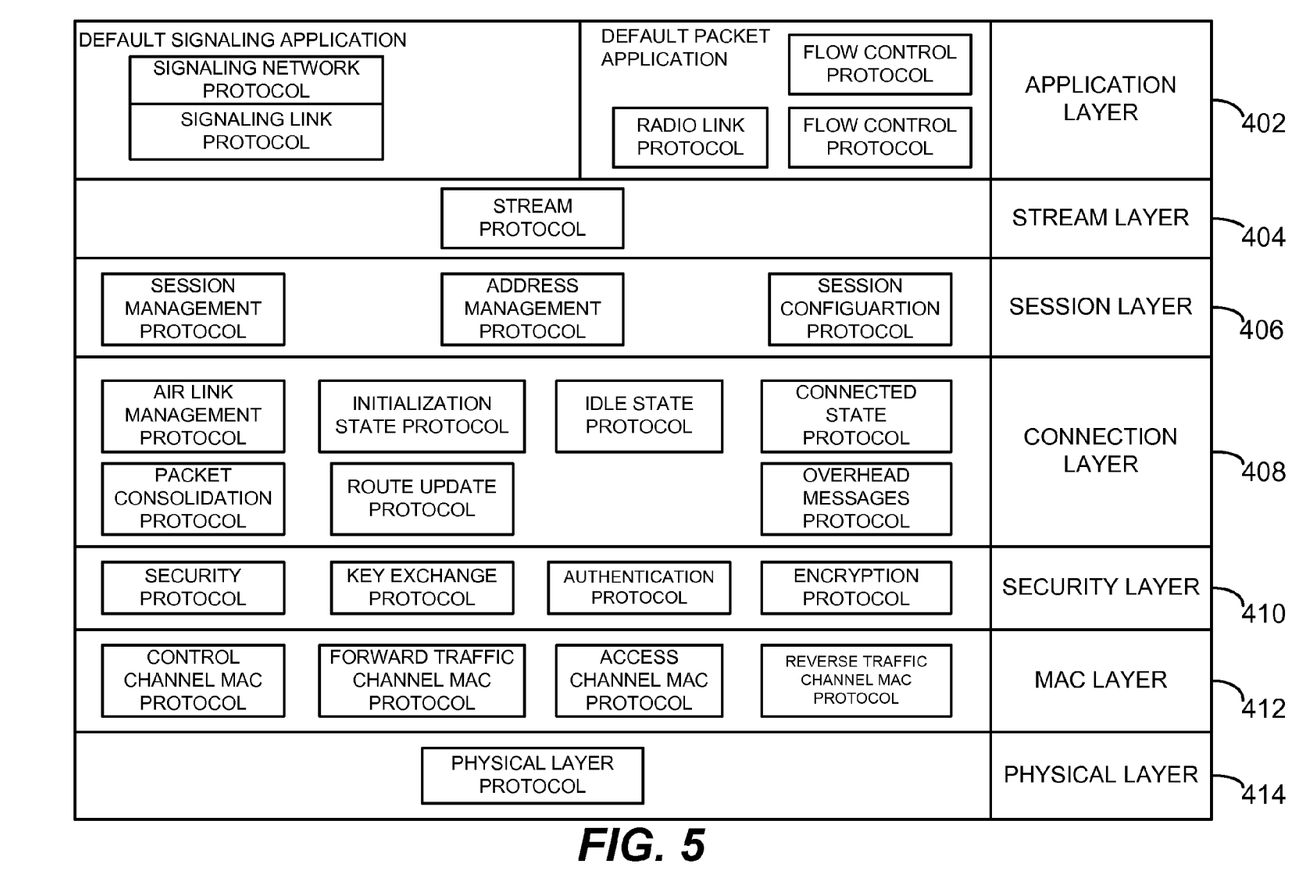
FIG. 5 is an expanded layering architecture diagram of the CDMA communication system of FIG. 3.

FIGS. 4 and 5 illustrate the layering architecture for air interface 306. Each layer comprises one or more protocols that performs the layer's functionality. Each protocol may be individually negotiated. The application layer 402 provides multiple applications. It provides the Default Signaling Application for transporting air interface protocol messages and the Default Packet Application for transporting user data. The stream layer 404 provides multiplexing of distinct application streams. The Default Stream Protocol provides four streams. Stream 0 is dedicated to signaling and defaults to the Default Signaling Application. Stream 1, Stream 2, and Stream 3 are not used by default. The Generic Virtual Stream Protocol provides a number of virtual streams to which applications may be bound. The session layer 406 provides address management, protocol negotiation, protocol configuration, and state maintenance services. The connection layer 408 provides air link connection establishment and maintenance services. The security layer 410 provides authentication and encryption services. The medium access control (MAC) layer 412 defines the procedures used to receive and to transmit over the physical layer. The physical layer 414 provides the channel structure, frequency, power output, modulation, and encoding specifications for the forward and reverse channels.

Each layer may contain one or more protocols. Protocols generally use signaling messages or headers to convey information to their peer protocols at the other side of the air-link (e.g., air interface 306). When protocols and applications send messages, they generally use the Signaling Network Protocol (SNP) to transmit these messages. The 3GPP2 standards define a set of interfaces for communicating between protocols in the same network entity and between a protocol executing in one entity and the same protocol executing in another entity.

Figure 6:
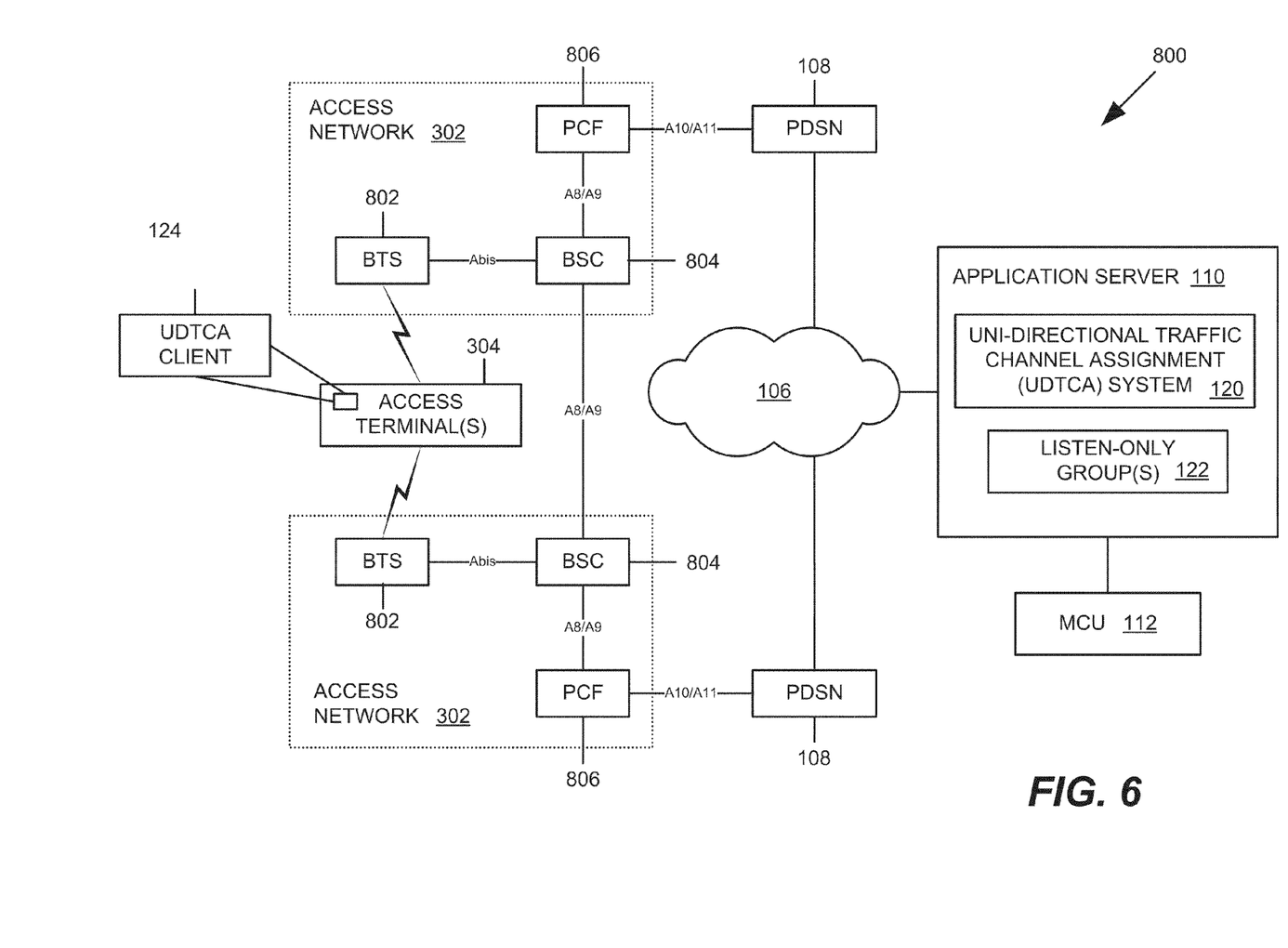
FIG. 6 is a block diagram of another embodiment of a communication system for establishing a receive-only group call via a uni-directional traffic channel assignment.

Having described the general architecture of a CDMA communication system 300, FIG. 6 illustrates one of a number of possible embodiments of a mobile communication system 800 implemented in a CDMA system, in which a receive-only group call may be established via a uni-directional traffic channel assignment. As illustrated in FIG. 6, a mobile communication system 800 comprises access network 302 with which access terminals 304 communicate as they roam through geographical areas or sectors, packet-switched network 106, PDSNs 108, application server 110, and MCU 112. As described above, the receive-only group call is established between access terminals 304 having a UDTCA client 124. Application server 110 includes the UDTCA system 120. As illustrated in FIG. 6, the access network 302 may comprise various system components, such as, for example, a base transceiver station (BTS) 802, a base station controller (BSC) 804, and a packet control function (PCF) 806. The BTS 802 comprises a mobile phone base station. The BTS 802 contains the transmit and receive technology and also the aerials to supply a radio cell or sector. The BSC 804 is typically responsible for transmitting to and receiving radio signals from the access terminals 304. In general, BSC 804 carries out transcoding of speech channels, allocation of radio channels to access terminals and other tasks related to the radio networks. The PCF 806 is the entity that typically controls the transmission of packets between the access network 302 and the PDSNs 108. The BTS 802, BSC 804, and PCF 806 are configured to support the applicable CDMA standards as applicable.

Figure 7:
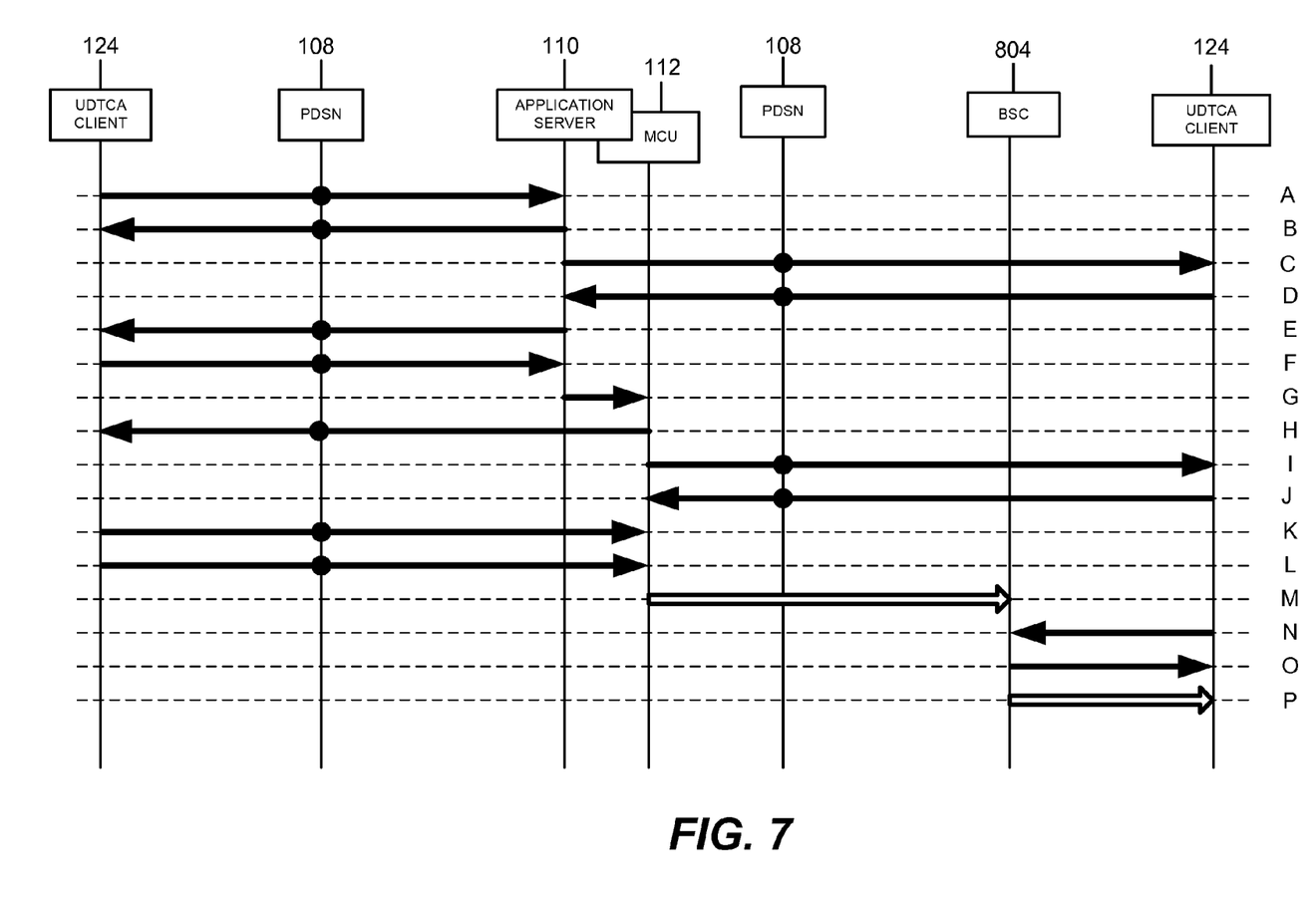
FIG. 7 is a call flow diagram of an embodiment of a method for establishing a receive-only group call via a uni-directional traffic channel assignment in a CDMA communication system.

FIG. 7 illustrates an embodiment of a process for establishing a receive-only group call between an originating mobile station and a plurality of receive-only destination mobile stations. As illustrated in the block diagram portion of FIG. 7, the call establishment process occurs via an infrastructure of various system components. In this regard, the logic associated with the call establishment process may be distributed across various systems components. In FIG. 7, the originating mobile station is shown in the left side of the figure, whereas the plurality of receive-only destination mobile stations would be located on the right side of the figure. In the embodiment of FIG. 7, the system components comprise: a software client (UDTCA 124) located at the originating access terminal and the receive-only receiving access terminals; service node(s) associated with the originating access terminal (PDSN 108); service node(s) associated with the receive-only destination mobile stations (PDSN 108); an application server 110; a media control unit (MCU) 112; and a BSC 804 associated with the receive-only receiving access terminals. It should be appreciated that, depending on the particular implementation of the system infrastructure, certain system components illustrated in FIG. 7 may be combined into a single component, as desired or practical. Furthermore, the logic or functionality associated with a particular system component in FIG. 7 may be distributed across other system components.

Referring to the flow diagram aspects of FIG. 7, at reference element A, the originating access terminal's UDTCA client 124 determines that a receive-only call is to be established with a receive-only group 116. The UDTCA client 124 transmits a call request on, for example, a reverse link access channel (ACH) to application server 110 via the PDSN 108. At reference element B, the application server 110 transmits an acknowledge (ACK) message to the originating access terminal on, for example, a common channel (CCH). At reference element C, the application server 110 determines that the call request corresponds to a receive-only group 116. It should be appreciated that the receive-only group 116 may be identified in a number of ways. In one of a number of possible embodiments, the receive-only group is specified via the differentiated services (DS) field, as defined in RFC 2474 of the Internet Protocol, which is hereby incorporated by reference in its entirety. As illustrated at reference element C, the application server 110 announces the call (via, for example, the CCH) to the receive-only mobile stations.

The application server 110 provides the call announcement message to the participating receive-only access terminals through corresponding PDSN(s) 108 and BSC(s) 804. The receive-only receiving access terminals may include an associated client (e.g., UDTCA client(s) 124) for enabling communication with the system. At reference element D, the participating receive-only access terminals accept the call by sending an "accept call" message to the application server 110 via, for example, a reverse link access channel (ACH). At reference element E, the application server 110 transmits a "floor grant" message to the originating access terminal (UDTCA client 124). At reference element F, the originating access terminal brings up a reverse link traffic channel and transmits an ACK message to the application server 110. At reference element G, the application server 110 initiates the receive-only group call. As illustrated in FIG. 7 and described above, the application server 110 may employ an associated MCU 112 to initiate the call. It should be appreciated that this functionality may be co-located with the application server 110 or remotely distributed.

At reference element H, the MCU information is provided to the originating access terminal on the traffic channel (TCH). At reference element I, the MCU 112 provides the MCU information to the participating receive-only access terminals on the traffic channel. At reference element J, the receive-only access terminals transmit an ACK message to the MCU 112 via, for example, the traffic channel. In this manner, the client software (e.g., UDTCA client 124) at the receive-only access terminals is configured to implement a receive-only mechanism. In one implementation, the client software may look at an application layer message or the DS field from the MCU 112 and then determine that a receive-only call is being established. At reference element K, the originating access terminal transmits an ACK MCU information message (via the traffic channel) to the MCU 112 and, at reference element L, the media associated with the receive-only group call is transmitted from the originating access terminal to the MCU 112. It should be appreciated that the MCU 112 may include an appropriate data buffering mechanism for handling the media provided by the originating mobile station.

At reference element M, the MCU 112 transmits the media to the BSC(s) 804 associated with the participating receive-only access terminals. Having determined that a receive-only call is being established, at reference element N, the participating receive-only access terminals may send a transition request to access network 304 (e.g., BSC(s) 804). The transition request notifies the access network that a uni-directional traffic channel should be established with the participating receive-only access terminals. At reference element O, the access network 304 implements the uni-directional channel assignment and effectively gates off the entire reverse link traffic channel associated with each participating receive-only access terminal. In other words, only a forward link traffic channel is established between access network 304 and the participating receive-only receiving access terminals. With the uni-directional traffic channels established and having received the media from MCU 112, at reference element P, the access network 304 provides the media from the originating access terminal to the participating receive-only access terminals on the uni-directional traffic channel.

Figure 8:
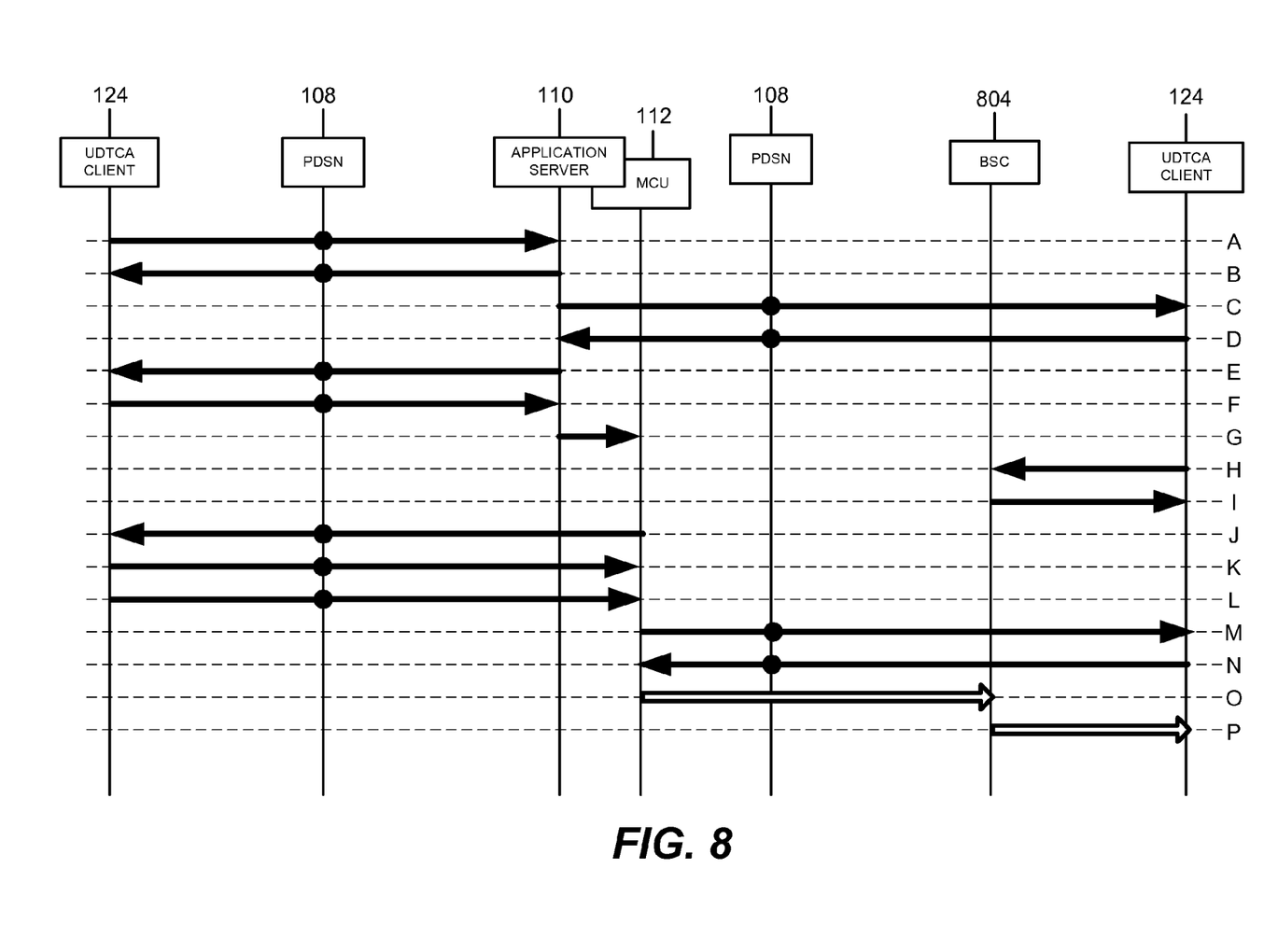
FIG. 8 is a call flow diagram of another embodiment of a method for establishing a receive-only group call via a uni-directional traffic channel assignment in a CDMA communication system.

One of ordinary skill in the art will appreciate that the uni-directional traffic channel may be implemented in various ways within the overall call establishment process. In the embodiment of FIG. 7 the uni-directional traffic channel is established after the participating receive-only access terminals transmit an ACK to the MCU 112. FIG. 8 illustrates another embodiment of a receive-only call establishment process. Although some aspects of the call establishment process of FIG. 8 are similar to that of FIG. 7, the entire call establishment process is described for purposes of clarity.

Referring to the embodiment of FIG. 8, at reference element A, the originating access terminal determines that a receive-only call is to be established, and the UDTCA client 124 transmits a call request on to the application server 112 via the PDSN 108. At reference element B, the application server 110 transmits an ACK message to the originating access terminal. At reference element C, the application server 110 determines that the call request corresponds to a receive-only group. The application server 110 announces the call to the receive-only access terminals in the receive-only group. The application server 110 provides the call announcement message to the participating receive-only access terminals through corresponding PDSN(s) 108 and BSC(s) 804. At reference element D, the participating receive-only access terminals accept the call by sending an "accept call" message to the application server 110. At reference element E, the application server 110 transmits a "floor grant" message to the originating mobile station (UDTCA client 124).

At reference element F, the originating access terminal brings up a reverse link traffic channel and transmits an ACK message to the application server 110. At reference element G, the application server 110 initiates the receive-only group call with MCU 112. At reference elements H and I, a uni-directional traffic channel assignment is established between the participating receive-only access terminals and access network 302. At reference element H, the participating receive-only receiving access terminals may send a transition request to the access network 302 (e.g., via BSC(s) 804), which notifies the access network 302 that a uni-directional traffic channel should be established with the participating receive-only receiving access terminals. At reference element I, the access network 302 replies to the transition request and the uni-directional traffic channel is established with the entire reverse link traffic channel gated off (i.e., only a forward link traffic channel is established between access network 302 and the participating receive-only receiving access terminals). At reference element J, the MCU information is provided to the originating access terminal. At reference element K, the originating access terminal transmits an ACK MCU information message (via the traffic channel) to the MCU 112 and, at reference element L, the media associated with the receive-only group call is transmitted from the originating access terminal to the MCU 112. At reference element M, the MCU 112 provides MCU information to the participating receive-only access terminals on the traffic channel. At reference element N, the receive-only access terminals transmit an ACK message to the MCU 112, via, for example, the traffic channel. In this manner, the client software (e.g., UDTCA client 124) at the receive-only access terminals is configured to implement a receive-only mechanism. In one implementation, the client software may selectively close a reverse link traffic channel with the access network 302. In another implementation, the client software may look at an application layer message or the DS field from the MCU 112 and then determine that a receive-only call is being established. It should be appreciated that the MCU 112 may include an appropriate data buffering mechanism for handling the media provided by the originating mobile station. At reference element O, the MCU 112 transmits the media to the BSC(s) 804 associated with the participating receive-only access terminals. With the uni-directional traffic channels established and having received the media from MCU 112, at reference element P, the access network 302 provides the media from the originating access terminal to the participating receive-only receiving access terminals on the uni-directional traffic channel.

It should be appreciated that any process or logical descriptions of the UDTCA system may represent modules, segments, or portions of code which include one or more executable instructions for implementing specific logical functions, steps, or acts in a process. It should be further appreciated that any logical functions may be executed out of order from that shown or discussed, including substantially concurrently or in reverse order, depending on the functionality involved, as would be understood by those reasonably skilled in the art.

One of ordinary skill in the art will further appreciate that the UDTCA system may be implemented using any communication protocol, computer language, etc. and may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the logic embodying the cellular-to-VoIP call establishment process for use by or in connection with the instruction execution system, apparatus, or device. The computer-readable medium may be, for example, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), a portable compact disc read-only memory (CDROM) (optical), and a communication signal containing the logic. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A communication system, comprising:
   an application server configured to communicate with a mobile communication network and establish a receive-only group call between an originating wireless communication device and at least one receive-only group comprising at least one receive-only wireless communication device;
   a media control unit configured to manage a media session between the originating wireless communication device and the at least one receive-only wireless communication device; and
   a receive-only wireless communication device comprising a memory having a client application stored thereon, the client application configured to enable the receive-only wireless communication device to participate in the receive-only group call via a uni-directional traffic channel with the mobile communication network.

2. The system of claim 1, wherein the client application is further configured to establish the uni-directional traffic channel with the mobile communication network.

3. The system of claim 1, wherein the client application is further configured to selectively close a reverse link traffic channel with the mobile communication network.

4. The system of claim 1, wherein the mobile communication network comprises a CDMA system.

5. The system of claim 4, wherein the client application is further configured to:
   transmit a uni-directional traffic channel transition request to a base station controller associated with the corresponding receive-only wireless communication device; and
   receive a transition complete reply from the base station controller.

6. The system of claim 5, wherein the base station is configured to selectively refuse the transition request.

7. The system of claim 4, wherein the a base station controller is configured to transmit a uni-directional traffic channel transition request to a wireless communication device such that the wireless communication device enters a receive-only mode.

8. The system of claim 1, wherein the client application comprises software stored on the receive-only wireless communication device.

9. The system of claim 1, wherein the media control unit and the application server are co-located.

10. A wireless communication device, comprising:
    a network interface device configured to communicate with a mobile network;
    a memory; and
    a processor coupled to the network interface device and the memory,
    wherein the memory stores a client application configured to cause the processor to perform operations to establish a receive-only group call between the wireless communication device and an originating wireless communication device, the client application further configured to cause the processor to perform operations to establish a uni-directional traffic channel between the wireless communication device and the mobile network by which the wireless communication device is limited to a receive-only role in the receive-only group call.

11. The device of claim 10, wherein the network interface device and the client application are configured to support CDMA communication.

12. The device of claim 11, wherein the CDMA communication comprises at least one of CDMA 2000 and 1xEV-DO.

13. The device of claim 10, wherein the uni-directional traffic channel comprises a forward-only traffic channel in which a reverse traffic channel is closed.

14. A method for establishing a multicast call between a plurality of wireless communication devices, the method comprising:
- defining a receive-only group comprising one or more receive-only wireless communication devices;
- receiving a call request initiated by an originating wireless communication device for establishing a multicast call to the receive-only group;
- inviting the one or more of the receive-only wireless communication devices to participate in the multicast call; and
- establishing a uni-directional traffic channel between the one or more of receive-only wireless communication devices and a corresponding access network for transmitting the media, wherein establishing the uni-directional traffic channel comprises closing a reverse link traffic channel.

15. The method of claim 14, wherein establishing the uni-directional traffic channel further comprises establishing the uni-directional traffic channel such that the uni-directional traffic channel supports a CDMA standard.

16. A method for establishing a group call between wireless communication devices in a wireless communication system, the method comprising:
- defining a receive-only group comprising one or more receive-only wireless communication devices;
- receiving a call request from an originating wireless communication device indicating the receive-only group with which a group call is to be established, the receive-only group specifying one or more receive-only wireless communication devices;
- inviting the one or more receive-only wireless communication devices to participate in the group call;
- establishing a traffic channel between the one or more receive-only wireless communication devices and a corresponding access network;
- transitioning the traffic channel to a uni-directional, forward-only traffic channel; and
- providing media from the originating wireless communication device to the one or more receive-only wireless communication devices via the uni-directional, forward-only traffic channel.

17. A wireless communication device, comprising:
means for communicating with a mobile network; and
means for establishing a receive-only group call through a uni-directional traffic channel between the wireless communication device and the mobile network by which the wireless communication device is limited to a receive-only role in the receive-only group call.

18. The wireless communication device of claim 17, wherein:
- means for communicating with a mobile network comprises means for communicating with a CDMA communication network; and
- means for establishing a receive-only group call comprises means for establishing a receive-only group call via a CDMA communication network.

19. The wireless communication device of claim 18, wherein the CDMA communication network comprises at least one of a CDMA 2000 communication network and 1xEV-DO communication network.

20. The wireless communication device of claim 17, wherein the uni-directional traffic channel comprises a forward-only traffic channel in which a reverse traffic channel is closed.

21. A non-transitory computer-readable medium having stored thereon processor-executable instructions configured to, cause a processor to perform operations comprising:
- defining a receive-only group comprising one or more receive-only wireless communication devices that receive a multicast group communication;
- receiving a call request initiated by an originating wireless communication device for establishing a multicast call to the receive-only group;
- inviting the one or more receive-only wireless communication devices to participate in the multicast call; and
- establishing a uni-directional traffic channel between the one or more receive-only wireless communication devices and a corresponding access network for transmitting the media for the group communication, wherein establishing the uni-directional traffic channel comprises closing a reverse link traffic channel.

22. The non-transitory computer-readable medium of claim 21, wherein establishing, via the first wireless communication device, a uni-directional traffic channel between the first wireless communication device and the mobile network comprises establishing the uni-directional traffic channel within a CDMA communication network.

23. A non-transitory computer-readable medium having stored thereon processor-executable instructions configured to cause a processor to perform operations comprising:
- communicating from a wireless communication device to a mobile network; and
- establishing a uni-directional traffic channel between the wireless communication device and the mobile network for a group communication between wireless communication devices on the mobile network, where the wireless communication device is limited to a receive-only role in the group communication.

24. The non-transitory computer-readable medium of claim 23, wherein the stored processor-executable instructions are configured to cause a processor to perform operations further comprising:
supporting CDMA communications between the wireless communication device and the mobile network.

25. The non-transitory computer-readable medium of claim 24, wherein the CDMA communications comprise at least one of CDMA 2000 and 1xEV-DO.

26. The non-transitory computer-readable medium of claim 23, wherein the stored processor-executable instructions are configured to cause a processor to perform operation such that the uni-directional traffic channel comprises a forward-only traffic channel in which a reverse traffic channel is closed.

27. A method for establishing a group call between a first wireless communication device and a mobile network, comprising:
- establishing, via the wireless communication device, a receive-only group call between the first wireless communication device and an originating second wireless communication device; and
- establishing, via the first wireless communication device, a uni-directional traffic channel between the first wireless communication device and the mobile network by which the first wireless communication device is limited to a receive-only role in the receive-only group call.

28. The method of claim 27, wherein establishing, via the first wireless communication device, a uni-directional traffic channel between the first wireless communication device and the mobile network comprises establishing a uni-directional traffic channel in a CDMA communication network.

29. The method claim 28, wherein the CDMA communication network supports at least one of CDMA 2000 and 1xEV-DO.

30. The method of claim 27, wherein establishing, via the first wireless communication device, a uni-directional traffic channel between the first wireless communication device and the mobile network comprises establishing a forward-only traffic channel in which a reverse traffic channel is closed.

31. An apparatus, comprising:
   means for defining a receive-only group comprising one or more receive-only wireless communication devices that receive a multicast group communication;
   means for receiving a call request initiated by an originating wireless communication device for establishing a multicast call to the receive-only group;
   means for inviting the one or more receive-only wireless communication devices to participate in the multicast call; and
   means for establishing a uni-directional traffic channel between the one or more receive-only wireless communication devices and a corresponding access network for transmitting the media for the group communication, wherein the establishing the uni-directional traffic channel comprises closing a reverse link traffic channel.

32. The apparatus of claim 31, wherein means for establishing the uni-directional traffic channel comprises means for establishing the uni-directional traffic channel on a CDMA communication network.

33. An apparatus for establishing a group call between wireless communication devices in a wireless communication system, comprising:
   means for defining a receive-only group comprising one or more receive-only wireless communication devices;
   means for receiving a call request from an originating wireless communication device indicating the receive-only group with which a group call is to be established, the receive-only group specifying one or more receive-only wireless communication devices;
   means for inviting the one or more receive-only wireless communication devices to participate in the group call;
   means for establishing a traffic channel between the one or more receive-only wireless communication devices and a corresponding access network;
   means for transitioning the traffic channel to a uni-directional, forward-only traffic channel; and
   means for providing media from the originating wireless communication device to the one or more receive-only wireless communication devices via the uni-directional, forward-only traffic channel.

34. A non-transitory computer-readable medium having stored thereon processor-executable instructions configured to cause a processor to perform operations comprising:
   defining a receive-only group comprising one or more receive-only wireless communication devices;
   receiving a call request from an originating wireless communication device indicating the receive-only group with which a group call is to be established, the receive-only group specifying one or more receive-only wireless communication devices;
   inviting the one or more receive-only wireless communication devices to participate in the group call;
   establishing a traffic channel between the one or more receive-only wireless communication devices and a corresponding access network;
   transitioning the traffic channel to a uni-directional, forward-only traffic channel; and
   providing media from the originating wireless communication device to the one or more receive-only wireless communication devices via the uni-directional, forward-only traffic channel.

\* \* \* \* \*